United States Patent [19]

Fujita

[11] Patent Number: 4,976,452
[45] Date of Patent: Dec. 11, 1990

[54] STAND DEVICE FOR TWO WHEELED VEHICLES

[75] Inventor: Haruyasu Fujita, Tokyo, Japan

[73] Assignee: Honda Giken Kogyo Kabushiki Kaisha, Tokyo, Japan

[21] Appl. No.: 345,691

[22] Filed: May 1, 1989

[30] Foreign Application Priority Data

May 6, 1988 [JP] Japan ................................ 63-108935

[51] Int. Cl.$^5$ .............................................. B62H 1/02
[52] U.S. Cl. ..................................... 280/293; 280/303
[58] Field of Search ....................... 280/293, 301, 303; 180/219, 271

[56] References Cited

U.S. PATENT DOCUMENTS

| 3,758,736 | 9/1973 | Tanaka ................................. 200/157 |
| 4,073,505 | 2/1978 | Yamazaki ......................... 280/293 X |
| 4,513,837 | 4/1985 | Archer .................................. 180/209 |
| 4,554,990 | 11/1985 | Kamiya et al. .................. 180/219 X |
| 4,569,239 | 2/1986 | Shirley et al. .................... 180/179 X |
| 4,651,845 | 3/1927 | Yagasaki .............................. 180/219 |
| 4,693,488 | 9/1987 | Bernocco ............................ 280/293 |
| 4,724,921 | 2/1988 | Ohta et al. ........................ 180/219 X |
| 4,766,982 | 8/1988 | Hayashi et al. .................. 180/219 X |

FOREIGN PATENT DOCUMENTS 2174656A 11/1986 United Kingdom ................ 280/293

Primary Examiner—Charles A. Marmor
Assistant Examiner—Alan M. Kagen
Attorney, Agent, or Firm—Lyon & Lyon

[57] ABSTRACT

The present invention solves the problems of the electrical surge and reduced reliability related to the shock loading experienced by previous two wheeled vehicle stands when the stand member contacts the ground during the time it is being driven by the stand motor to a position for supporting the two wheeled vehicle. This is achieved by having a drive mechanism consisting of a plurality of reduction gears to transmit the drive from the stand motor to the stand member, thereby reducing the torque loading on the stand motor, and by mounting the drive mechanism so that it can move relative to the body of the two wheeled vehicle when the stand member first contacts the ground, and restricting this movement with a buffer device which absorbs the shock loading.

11 Claims, 11 Drawing Sheets

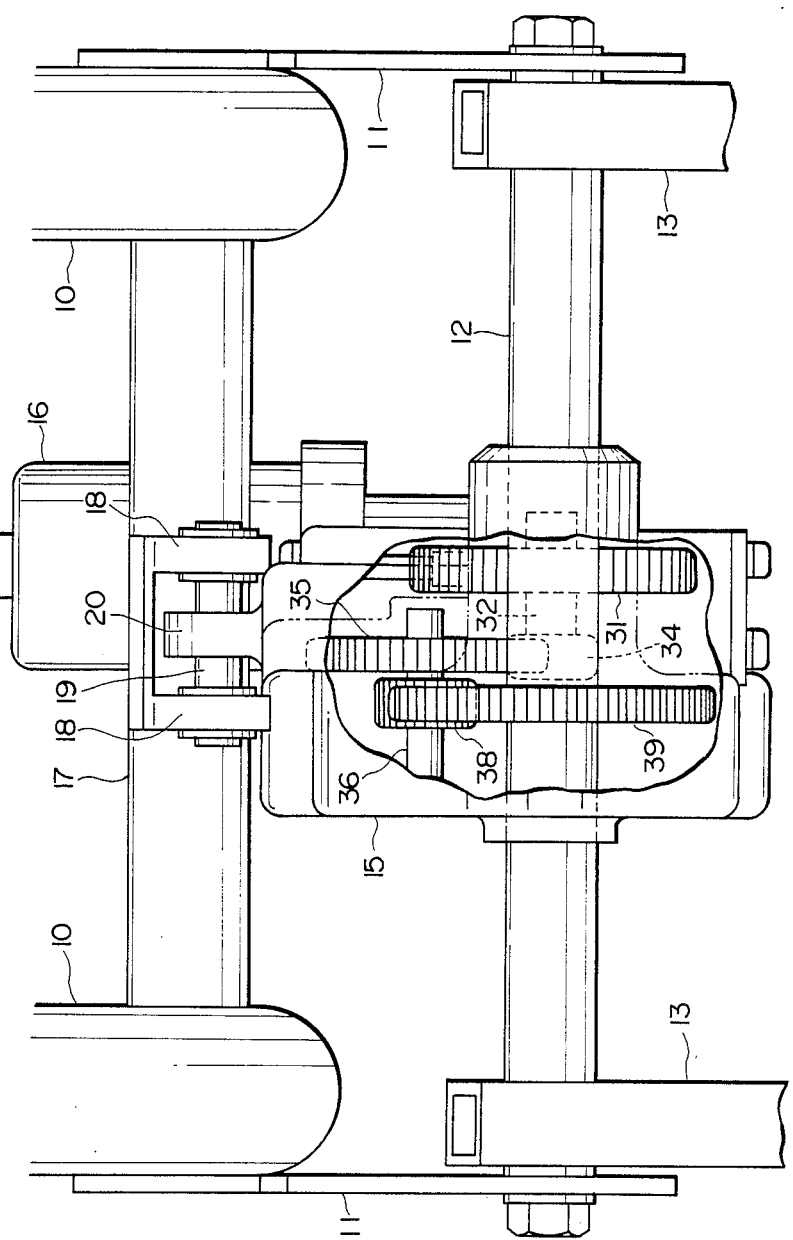

STAND DEVICE FOR TWO WHEELED VEHICLES

BACKGROUND OF THE INVENTION

1. Field of the Invention

Field of the present invention concerns a stand for supporting a two wheeled vehicle.

Prior art concerning a method for supporting a two wheeled vehicle is presented in Japanese Patent Application Publication No. 53-4564 and is best explained with reference to FIG. 1 herein.

In FIG. 1 a main stand 103 and a circular segment gear 106 are fixed to a common support shaft which is rotatably supported by bearings in a bracket 102 attached to the main frame 101. A worm gear 105 attached to the motor 104 drive shaft, meshes with the circular segment gear 106 and, by the rotation of the motor 104 through the worm gear 105 and the circular segment gear 106, the main stand 103, shown in the retracted position by full lines, can be rotated to the upright position indicated by broken lines. Conversely rotation of the motor 104 in the opposite direction causes the main stand 103 to move back to the retracted position.

The problem with this conventional method of supporting a two wheeled vehicle is due to the load experienced by the motor 104. In the course of the main stand 103 moving from the retracted position to the upright position, the load it puts on the motor 104 varies. In the first instance the main stand 103 swings down with almost no resistance and the load on the motor 104 is affected negligibly, but when the end of the main stand 103 touches the ground there is a sudden increase in load on the motor 104 as it starts to lift the vehicle. At this point the load on the motor 104 is a maximum. Then as the main stand 103 comes close to the perpendicular position the load decreases. This load change gives a corresponding change in the electrical current load on the motor 104 as shown in FIG. 2.

At the start of drive shown as stage I in FIG. 2, the current first rises sharply. This is due to the motor 104 starting current characteristics and not related to the drive mechanism. The load current then settles to a low value (stage II) as the main stand 103 swings down. Then when the end of the main stand 103 touches the ground the load current increases suddenly (stage III) due to the sudden increase in load on the main stand 103. The current at this time is seen to be well over the starting current peak. Then as the main stand 103 comes to the upright position, it commences to lift the body of the vehicle. During the lifting period, the peak current remains at a relatively high value (stage IV) and from the point when the main stand 103 becomes perpendicular, the load current decreases abruptly (stage V).

Due to the characteristic of the load current peaking at stage III during the operation of the stand the following problems result:

(1) It is necessary to have the motor capacity large enough to ensure that the motor capacity is at all times sufficient to carry the maximum peak load.

(2) The peak load puts extra load on the drive components so that they must be designed strong enough so their endurance and reliability is sufficient to carry this peak load.

(3) Since it is possible that the peak load surge will have an influence on other electrical loads supplied from the same power source it is necessary to have the power source large enough to provide for this additional peak load.

SUMMARY OF THE INVENTION

The present invention is directed to a way of reducing the peak load current and mechanical stresses that a two wheeled vehicle stand experiences when the stand member touches the ground.

With this invention the stand consists of; a stand member, a motor providing a drive source for the stand member and connected to a drive mechanism to transmit this drive to the stand member, and a support system to support the drive mechanism, motor and stand member. This support system enables the drive mechanism and motor to move with respect to the vehicle about a pivot on the two wheeled vehicle, and an element of the support system is connected to a part of the vehicle through a buffer element.

With this support system, if the stand member movement is obstructed, there is an opposing action on the support system. This tends to turn the drive mechanism and motor relative to the vehicle so that the force is suddenly increased on the buffer element positioned between the element of the support system and a part of the two wheeled vehicle. However since the buffer element can absorb this sudden increase in force, it alleviates the sudden increase in load that would otherwise be transmitted to the drive mechanism and motor if there was no buffer element and the support system was rigidly fixed to a part of the two wheeled vehicle.

Consequently the surge in the load current to the motor can be reduced so that the motor can be smaller and the motor and drive mechanism endurance and reliability increased. Furthermore the detrimental effect of surges in the load current on other equipment using the same power source can be reduced.

BRIEF DESCRIPTION OF THE DRAWINGS

FIG. 6 is a cut away view of one area of the two wheeled vehicle stand of FIG. 3 as seen from the front.

DETAILED DESCRIPTION OF THE PREFERRED EMBODIMENTS OF THE PRESENT INVENTION

Preferred embodiments of the present invention will be described referring to the attached drawings from FIG. 3 to FIG. 11.

Figure 3:
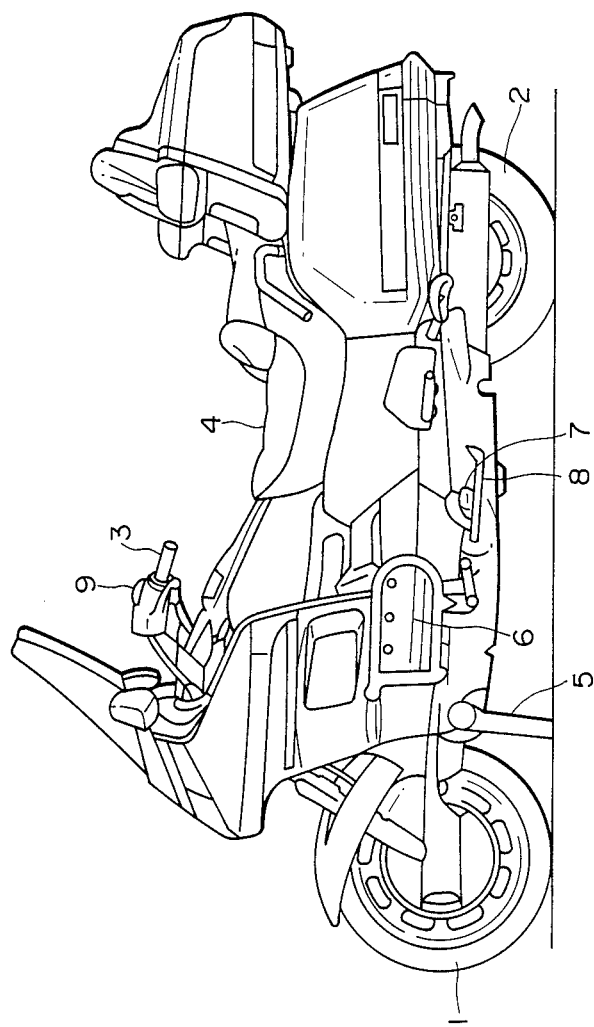
FIG. 3 shows a side view of a motor cycle with a first preferred embodiment of the two wheeled vehicle stand of this invention attached.

FIG. 3 shows a side view of the body of a two wheeled motor cycle being an example of a first preferred embodiment of this invention. There is a front wheel 1, a rear wheel 2, a handle bar 3 and a seat 4. The main stand 5 of this invention is provided on the front end of the frame of the motor cycle near the front wheel. At the center region of the main body of the motor cycle a little toward the front, is an engine 6 with its cylinders positioned horizontally across the vehicle. The main stand 5 is attached to the vehicle frame below and forward of the same engine 6. Below the seat 4, foot rests 7 are attached on either side, and in the proximity of one of the foot rests 7 on one side of the vehicle, a side stand 8 is attached. Concerning the main stand 5, the movement of the stand member can be controlled by a switch 9 attached to the handle bar 3.

In FIG. 3 the main stand 5 is shown in the upright position and the vehicle front section is lifted so that the main body is supported by the main stand 5 and the rear wheel 2. With the front wheel 1 hanging down the lower edge of the wheel 1 touches the ground lightly. At the time of driving the main stand 5 is swung rearward allowing the vehicle freedom to lean over.

Figure 4:
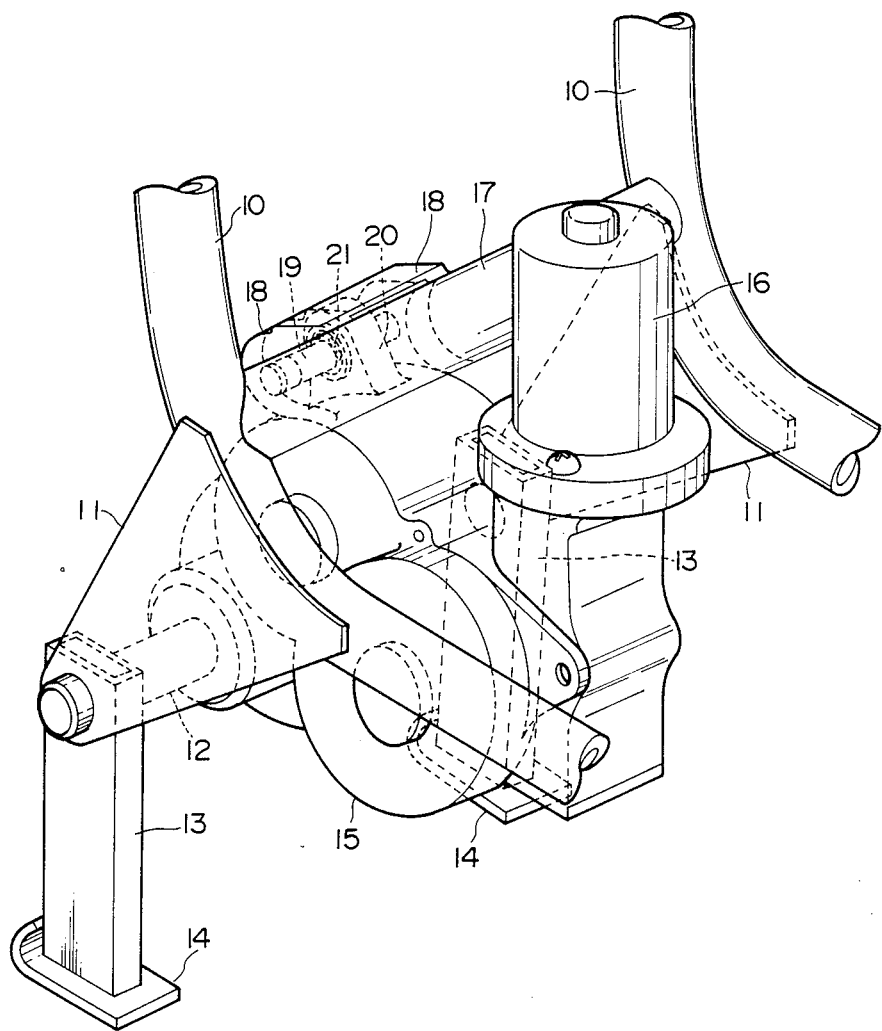
FIG. 4 is an oblique view of the two wheeled vehicle stand of FIG. 3.

An oblique view of the main stand 5 is given in FIG. 4. At the bent section of a pair of down tubes 10 stretching down from an upper main frame of the two wheeled vehicle, respective brackets 11 are positioned. Between both brackets 11 an actuator shaft 12 is arranged transverse and horizontal and free to rotate. Stand legs 13 are fixed to the actuator shaft 12 near the inside face of each of the brackets 11. By the rotation of the actuator shaft 12, the stand legs 13 can be swung down. Tread plates 14 are fixed to the ends of the stand legs 13. A central portion of the actuator shaft 12 passes through and supports a gearbox 15, and at the rear portion of the gear box 15, a motor 16 is fixed with its drive shaft set in the downward direction into the gearbox 15.

Above the actuator shaft 12 and between the bent sections of the down tubes 10, a frame 17 is rigidly attached to lie parallel to the actuator shaft 12. At the front and on either side of the center of the frame 17 a pair of brackets 18 are attached. Between these brackets 18 is positioned a support shaft 19 (see FIG. 6). The support shaft 19 passes through a hole in a lug 20 provided on the upper surface of the gearbox 15. Between the support shaft 19 and the internal face of the hole in the lug 20 is positioned a cylindrical rubber bushing 21 (see FIG. 5). In this way the gearbox 15 is supported by the actuator shaft 12 and the support shaft 19, and the lug 20 of the gearbox 15 is attached to the support shaft 19, which is rigidly fixed to the frame 17, by means of the rubber bushing 21. During operation with the center of gravity of the vehicle to the rear of the actuator shaft 12, the gearbox 15, in trying to rotate the actuator shaft 12 about its axis, is prevented from moving by the support shaft 19 through the medium of the rubber bushing 21.

Figure 5:
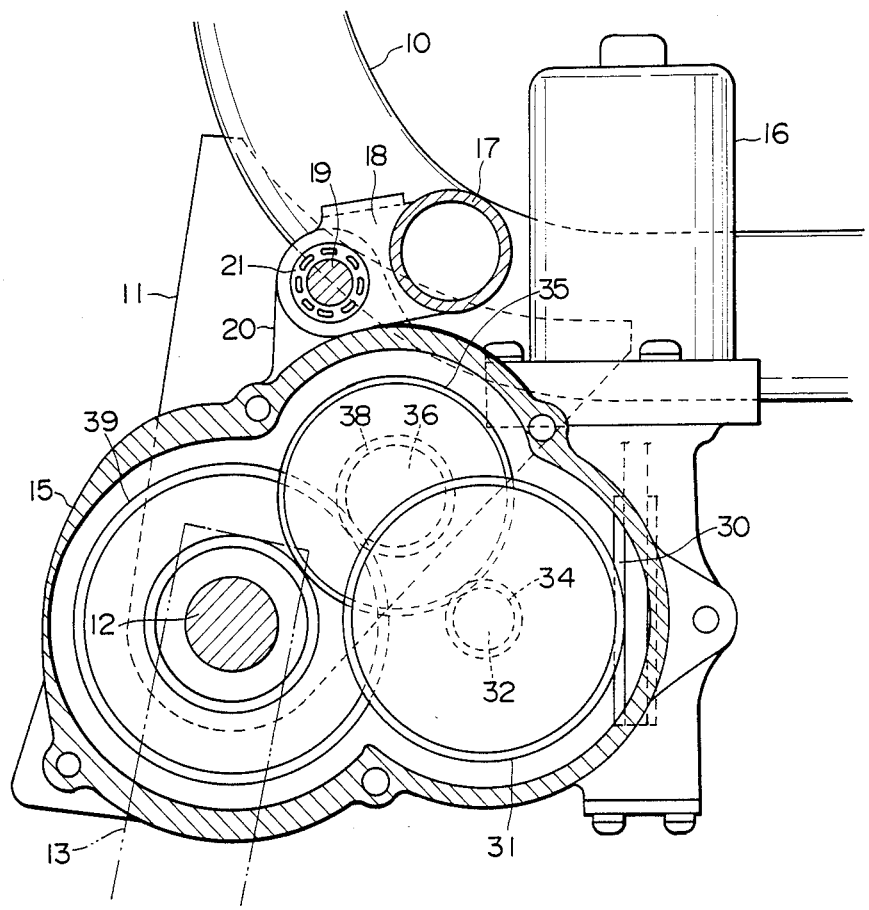
FIG. 5 is a sectional view from the side of the two wheeled vehicle stand of FIG. 3.
Figure 5A:
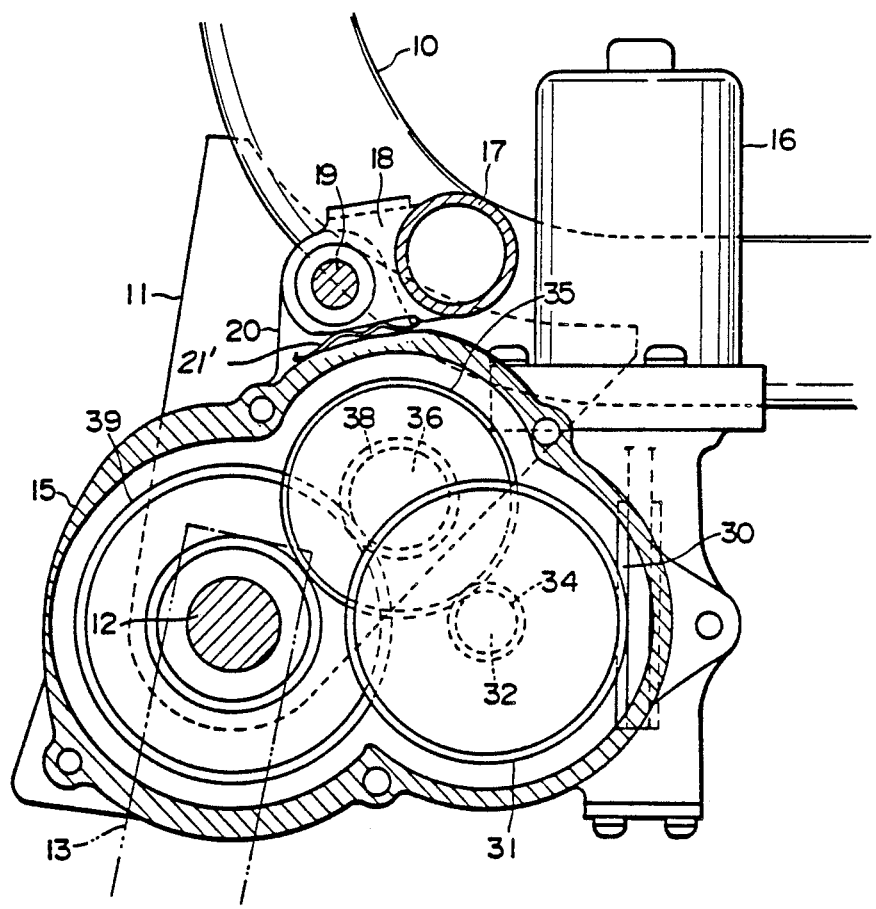
FIG. 5A is a sectional view, similar to FIG. 5, illustrating an alternate form of the invention.
Figure 7:
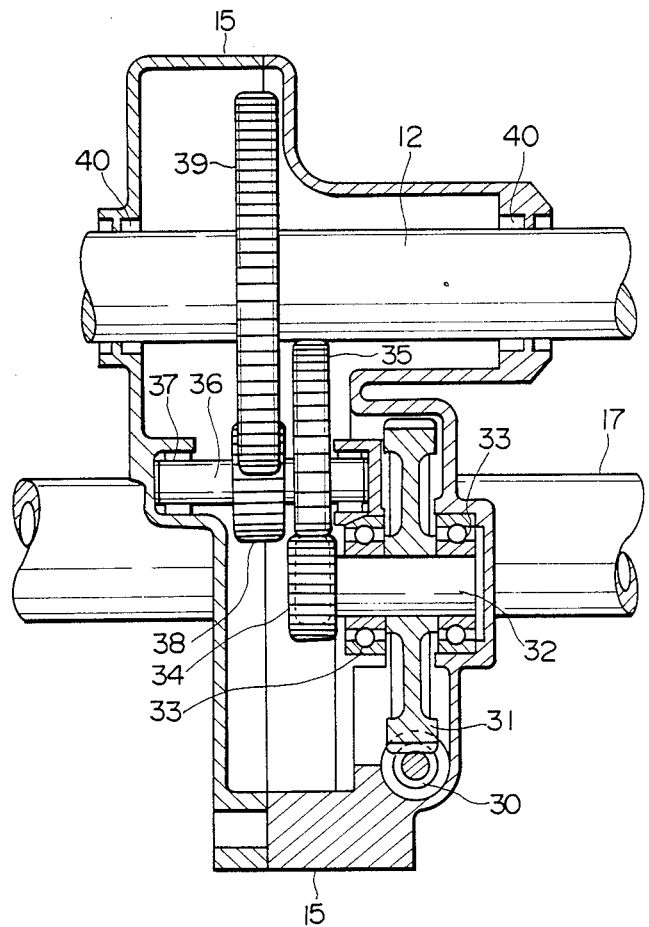
FIG. 7 is a sectional view of the two wheeled vehicle stand of FIG. 3 as seen from underneath.

An explanation of the construction of the gearbox 15 will be given with reference to drawings from FIG. 5 to FIG. 7. FIG. 5 is a side view of the gearbox 15, FIG. 6 is a cut away view from the front of the gearbox 15 and FIG. 7 is a cross section view from beneath the gearbox 15. The worm gear 30 of the motor 16 is positioned inside the gearbox 15. This gear meshes with the worm wheel 31 fixed to the rotatable shaft 32 lying parallel to the actuator shaft 12. On each side of the worm wheel 31 are provided bearings 33 which support the worm wheel 31 so it can rotate as one body with the shaft 32 and the small gear 34 which is also fixed to the shaft 32. Forward from and parallel to the shaft 32 and positioned across and at a higher position is a shaft 36 supported by bearings 37 so it is free to rotate as one body with a small gear 38 and a big gear 35, which meshes with the small gear 34. The small gear 38 meshes with a large gear 39 fixed to the actuator shaft 12 which passes through the gearbox. The actuator shaft 12 is supported by bearings 40, so it can rotate freely with respect to the gearbox 15.

Accordingly, rotation of the drive motor 16 rotates the worm gear 30 which in turn rotates the worm wheel 31 which meshes with the worm gear 30 and rotates together with the small gear 34 attached to the same shaft 32, and the gear 35 which meshes with the small gear 34 also rotates together with the small gear 38 fixed to the same shaft 36, and the rotation of the gear 38 which meshes with the large gear 39 causes the gear 39 to rotate together with the actuator shaft 12. In this way the rotation from the worm gear 30 is transmitted through stages of small to large gears to the actuator shaft 12 so that for each stage the rotation speed is decreased. As the rotation speed is reduced, the load capacity is increased proportionally so that the torque at the actuator shaft 12 is greater than the torque of the drive motor 16. By forward rotation of the motor 16, the actuator shaft 12 and the stand legs 13 move in the clockwise direction as seen in FIG. 5 to move to the upright supporting position. When the motor 16 rotates in the opposite direction, the stand legs 13 move in the counter clockwise direction to the retracted position.

In this first preferred embodiment, the main stand 5 is constructed as above, and the increase in load of the motor 16 when the stand legs 13 are extended to the upright position depends on the construction and is considered as follows. With the stand legs 13 in the horizontal retracted position the motor 16 rotates forward. In the first instance, since the resistance force from the stand does not increase, the motor 16 rotates under light load. When the tread plates 14 on the ends of the stand legs 13 touch the ground there is a sudden increase in the reaction loading preventing the central portion of the stand legs 13 actuator shaft 12 from rotating.

Figure 1:
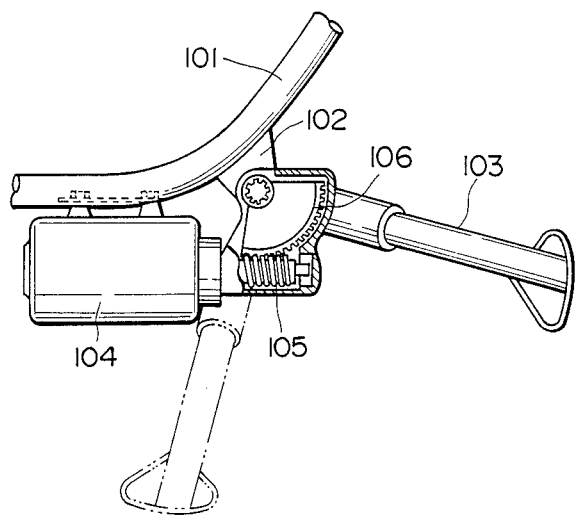
FIG. 1 is a cut away drawing showing an example of a prior art two wheeled vehicle stand device.
Figure 2:
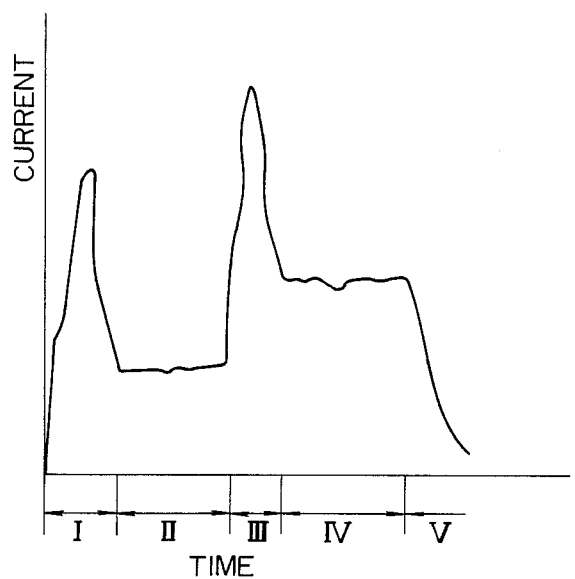
FIG. 2 shows the change in motor load current against time during operation of the prior art two wheeled vehicle stand.
Figure 8:
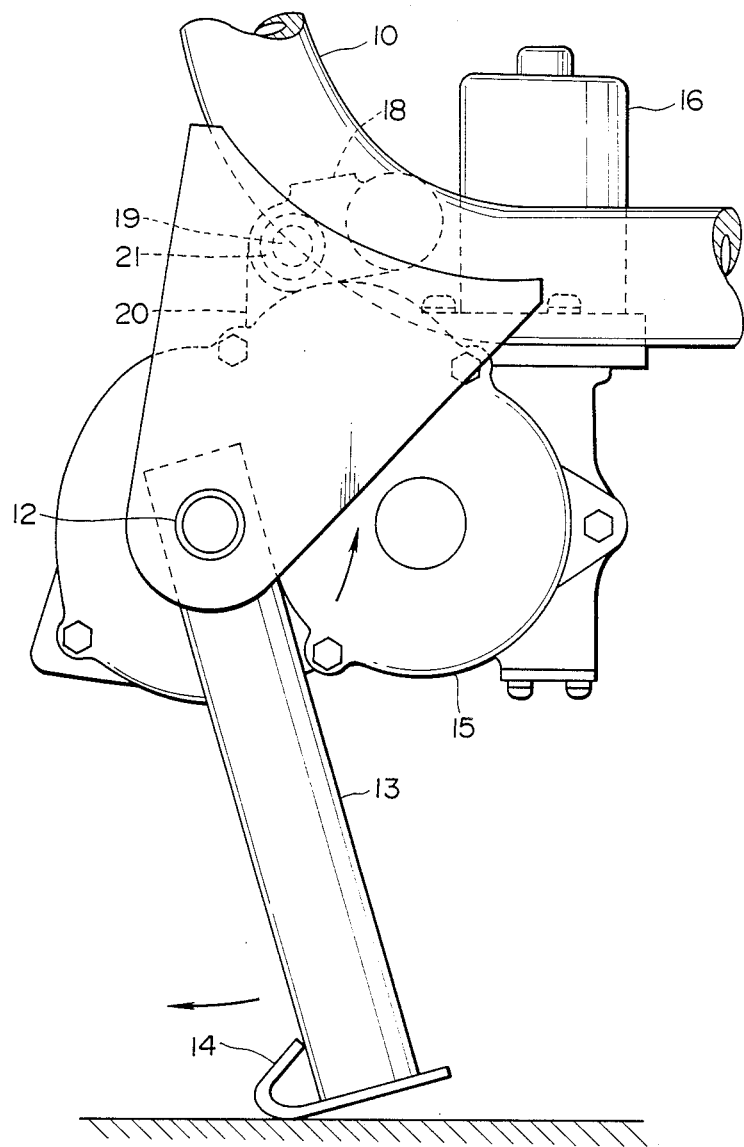
FIG. 8 is a side view showing the state where the stand tread tip of the two wheeled vehicle of stand of FIG. 3 is contacting the ground.

FIG. 8 shows the condition with the tread plates 14 in the state of contacting the ground. The actuator shaft 12 of the stand legs 13 is obstructed from rotating in the direction of the arrow, and by an opposite action, the gearbox 15 receives a shock load in the counterclockwise direction, shown by the arrow, about the axis of the actuator shaft 12. This shock load on the gearbox 15, is reduced by the cushioning effect of the rubber bushing 21 fitted between the lug 20 on the gearbox and the support shaft 19 rigidly fixed to the frame 17. This rubber bushing 21 allows the gearbox 15 to rotate a little about the axis of the actuator shaft 12 so that the forces on the rubber bushing 21 are transformed into compressive forces on one side and tensile forces on the other side so that the shock load is absorbed by these forces in the rubber bushing 21. Therefore the shock load that passes through the successive gears to the drive shaft of the motor 16 is reduced and the sudden surge in current accompanying the shock load is reduced. That is to say, the sudden current peak in stage III of FIG. 2 showing the current change, is reduced.

Since the value of the peak load current of the motor 16 is reduced, the motor size can be reduced. Also the surge to the motor 16 power source is reduced so that it is not necessary to have a larger power source to avoid affects on other equipment using the same power source. Further, since the peak shock load is reduced the endurance and reliability of the motor and the drive mechanism is increased.

Figure 9:
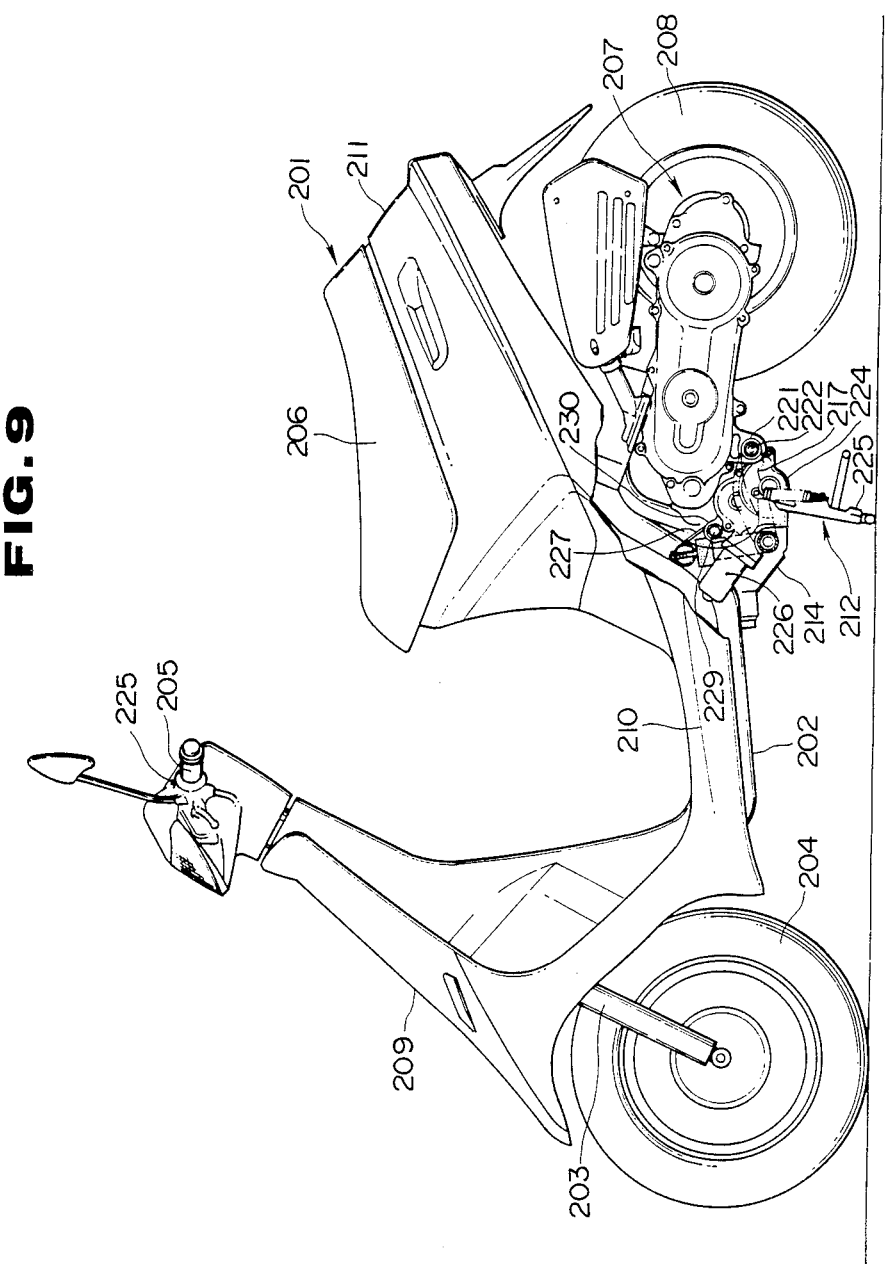
FIG. 9 shows a side view of a motor cycle with a second preferred embodiment of the two wheeled vehicle stand of this invention attached.

FIG. 9 shows a side view of the body of a two wheeled motor cycle with a stand device of this invention being an example of a second preferred embodiment of this invention. The motor cycle 201 comprises a chassis 202, front fork 203, that pivots the front wheel 204, steering handle 205, seat 206, power unit 207, rear wheel 208, front cover 209, floor panel 210 on which the feet of the driver rest, rear cover 211, stand assembly 212 and stand control switch 255 attached to the steering handle 205.

In FIG. 9 the stand member 225 is shown in the upright position and the vehicle rear section is lifted so that the motor cycle 201 is supported by the stand member 225 and the front wheel 204 with the rear wheel 208 hanging down. At the time of driving the stand member 225 is swung rearward allowing the vehicle freedom to lean over.

Figure 10:
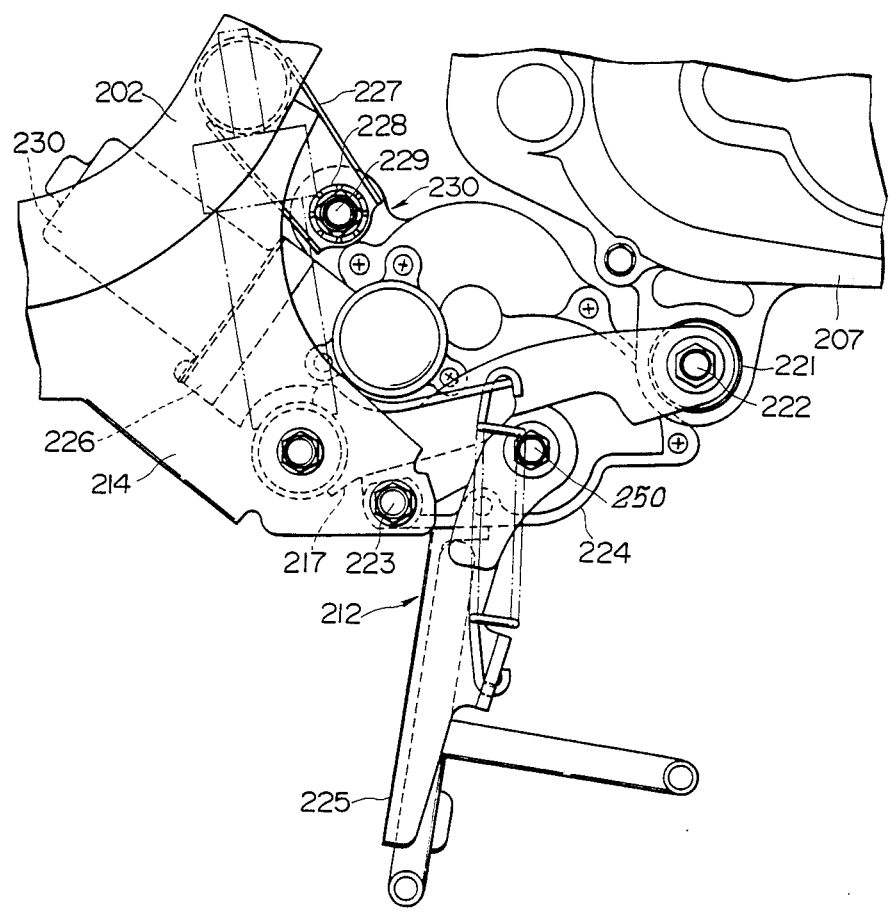
FIG. 10 is a view of the two wheeled vehicle stand of FIG. 9.

A view of the stand assembly 212 is given in FIG. 10. As shown in FIG. 10, the power unit 207 is linked to a pair of arms 217 through a rubber bushing 221 by a bolt 222. The stand assembly 212 consists of; a casing 224 that pivots about a pivot shaft 223 inside a bracket 214 and is prevented from rotating about the pivot shaft 223 by a rubber bushing 228 fitted inside a lug 230 on the casing 224 between the lug 230 and a support pin 229 rigidly attached to arm 227 of the chassis 202, a stand member 225 that is turned through set angles to either the upright position or the retracted position by gears inside the casing 224, and a stand motor 226 attached to the casing 224 and extending into the casing 224. The casing 224 and stand motor 226 are located between the two arms 217 on the rear of the chassis 202. With this configuration the stand assembly 212 is rotatably supported by the pivot shaft 223 and by the support shaft 229, through the medium of the rubber bushing 228 inside the lug 230.

Figure 11:
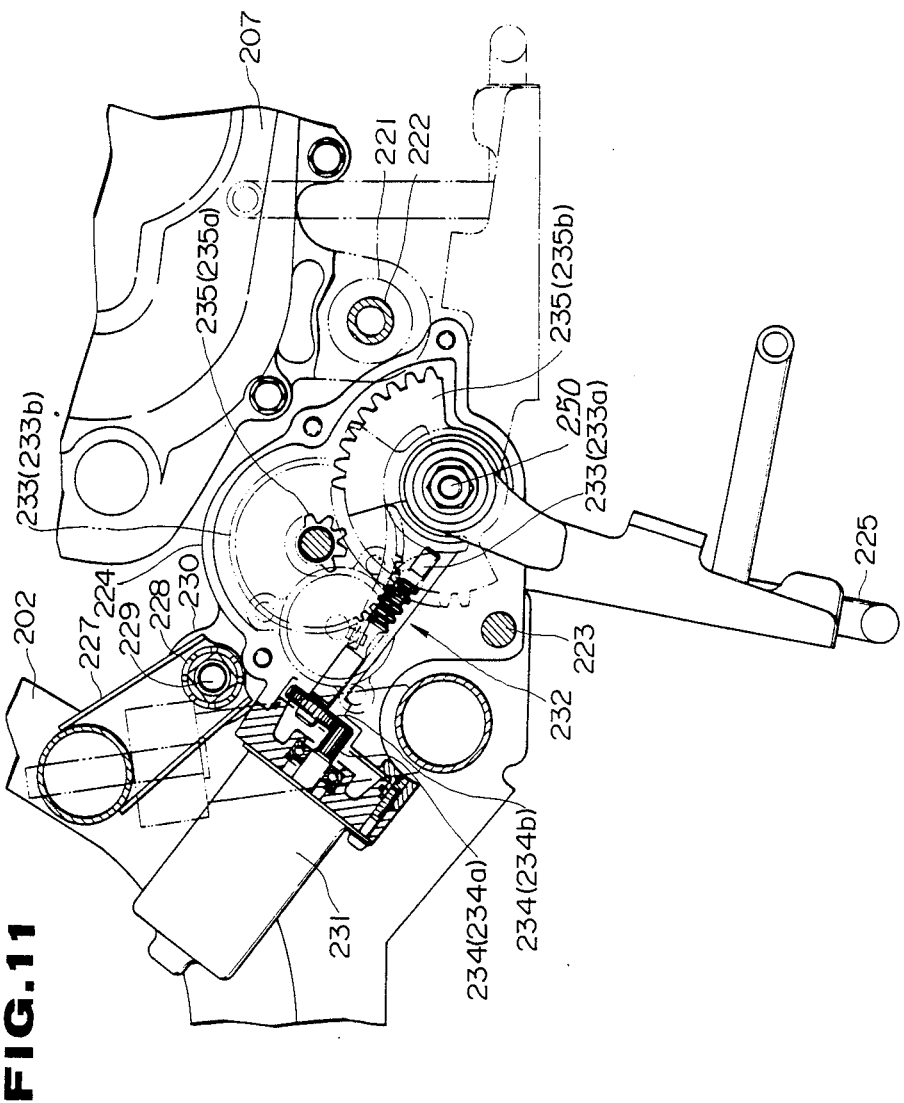
FIG. 11 is a sectional view of the two wheeled vehicle stand of FIG. 9.

FIG. 11 shows details of the drive mechanism of the stand assembly 212. The casing 224 contains the rotary drive shaft 250 that rotates the stand member 225. The drive shaft 250 is rotated by the electric motor 231 through the transmission gear assembly 232. The motor 231 is installed parallel to the longitudinal axis of the motorbike, and at a right angle to the drive shaft 250.

The transmission gear assembly 232 consists of a primary reduction gear unit 234 and a secondary reduction gear unit 235. The primary reduction gear unit contains a worm gear 233 composed of a worm 233a parallel to the rotary shaft of the electric motor 231, a worm wheel 233b that engages the worm 233a, a drive gear 234 directly linked with the rotary shaft of the motor 231, and a driven gear 234b directly linked with the worm 233a. The secondary reduction gear unit 235 consists of a driven gear 235a installed coaxial with the worm wheel 233b, and a driven gear 235b that rotates with the drive shaft 250.

The rotation speed of the electric motor 231 is reduced by the primary reduction gear unit 234, worm gear 233, and secondary reduction gear unit 235. The axes of the primary reduction gear unit 234 are parallel to the rotary shaft of the electric motor 231, while the axes of the secondary reduction gear unit 235 are perpendicular to the motor shaft because the direction of their axes is changed by the worm gear 233. In other words, the axes of the primary and secondary reduction gears 234 and 235 are perpendicular to each other. The driven gear 235b of the secondary reduction gear unit 235 is a circular segment gear and is coaxial with and fixed to rotate as one with the drive shaft 250 and stand member 225.

Accordingly the rotation from the motor 231 is transmitted through primary and secondary reduction gear units to the drive shaft 250 so that for each stage the rotation speed is decreased. As the rotation speed is decreased, the load capacity is increased proportionally so that the torque at the drive shaft 250 is greater than the torque of the drive motor 231.

By forward rotation of the motor 231, the drive shaft 250 and the stand member 225 move in the clockwise direction as seen in FIG. 11 to move to the upright supporting position. When the motor 231 rotates in the opposite direction, the stand member 225 moves in the counter clockwise direction to the retracted position.

In this second preferred embodiment, the two wheeled vehicle stand device is constructed as above, and the increase in load of the motor 231 when the stand member 225 is extended to the upright position depends on the construction and is considered as follows.

With the stand member 225 in the horizontal retracted position the motor 231 rotates forward. In the first instance, since the resistance force from the stand does not increase, the motor 231 rotates under light load. When the end of the stand member 225 touches the ground there is a sudden increase in the reaction loading preventing the stand member 225 drive shaft 250 from rotating. This gives a shock load to the gears 235, 234, 233, motor 231 and casing 224 so that the the casing 224 tends to rotate about the pivot pin 223. However it is prevented from doing so by the attachment to the chassis 202 through the medium of the rubber bushing 228 fitted between the lug 230 on the casing 224 and the support shaft 229 which is rigidly fixed to arm 227 of the chassis 202. This rubber bushing 228 allows the casing 224 to rotate a little about the pivot pin 223 so that the forces on the rubber bushing 228 are transformed into compressive forces on one side and tensile forces on the other side so that the shock load is absorbed by these forces in the rubber bushing 228. Therefore the shock load that passes through the gears 235, 234, 233 to the drive shaft of the motor 231 is reduced and the sudden surge in current accompanying the shock load is reduced. That is to say, the sudden current peak in stage III of FIG. 2 showing the current change, is reduced.

Since the value of the peak load current of the motor 231 is reduced, the motor size can be reduced. Also the surge to the motor 231 power source is reduced so that it is not necessary to have a larger power source to avoid affects on other equipment using the same power source. Further, since the peak shock load is reduced the endurance and reliability of the motor and the drive mechanism is increased.

With the first preferred embodiment of the invention the hole in the lug 20 of the gearbox 15 is fitted with the rubber bushing 21 at the connection with the support shaft 19 which is rigidly fixed to the main frame of the vehicle through the frame 17, to allow movement of the gearbox 15 about the axis of the actuator shaft 12. However instead of a rubber bushing 21 between a portion of the gearbox 15 and a portion of the main frame of the vehicle, it is possible to have a spring 21 or some other cushioning device to allow the gearbox 15 to move, and so absorb the load that would otherwise be transmitted to the gear box 15 and subsequently to the drive motor 16. Also, with the second preferred embodiment of the invention the hole in the lug 230 of the casing 224 is fitted with the rubber bushing 228 at the connection with the support shaft 229 which is rigidly fixed to arm 227 on the chassis 202 of the vehicle, to allow movement of the casing 224 about the pivot pin 223. However instead of a rubber bushing 228 between a portion of the casing 224 and a portion of the main frame of the vehicle, it is possible to have a spring or some other cushioning device to allow the casing 224 to move, and so absorb the load that would otherwise be transmitted to the gears in the casing 224 and subsequently to the drive motor 231.

Further, with the first preferred embodiment, two legs positioned on either side of the center line of the vehicle are used to support the vehicle and with the second preferred embodiment a single stand member is used to support the vehicle, however instead of two legs or a single stand member it is possible to have any combination of leg elements.

EFFECTS OF THE INVENTION

With this invention, since the shock load when the stand member touches the ground at the time of lowering the stand device can be absorbed by the buffer element, the shock load on the drive mechanism is reduced and the sudden peak in the load current of the stand motor is reduced. Accordingly the drive mechanism and stand motor endurance and reliability is increased, the stand motor size can be reduced, and the detrimental effect of surges on other equipment using the same power supply can be avoided so that the stand motor power source can consequently be smaller.

What is claimed is:

1. A stand device for two wheeled vehicles having a vehicle frame, comprising:
   (a.) a stand member rotatably supported by said vehicle frame;
   (b.) a drive mechanism attached to said vehicle frame and operatively connected to said stand member to rotate said stand member between an upright position in which said stand member supports said vehicle and a retracted position angularly displaced from said upright position, said drive mechanism including a motor, reduction gearing for drivingly connecting said motor to said stand member, and a housing for mounting said motor and said reduction gearing; and
   (c.) means for attaching said drive mechanism to said vehicle frame including pivot support means for supporting said housing from said vehicle frame for pivoted movement in a direction counter to the direction of movement of said stand member in moving to said upright position, and buffer means interposed between said housing and said vehicle frame at a location remote from said pivot support means for absorbing force increases between said stand member and said drive mechanism when said drive mechanism pivots said stand member during operation thereof.

2. A stand device for two wheeled vehicles according to claim 1 in which said buffer means comprises a resilient body interposed between said housing and said vehicle frame.

3. A stand device for two wheeled vehicles according to claim 2 in which said buffer means comprises a rod on one of said housing and said vehicle frame and a lug spacedly encircling said rod and being attached to the other of said housing and said vehicle frame, and said resilient body is a rubber body concentrically disposed between said rod and said lug.

4. A stand device for two wheeled vehicles according to claim 1 wherein said drive mechanism includes an electric motor connected by a control switch to a power source for driving said reduction gearing to reduce torque loading on said electric motor and transmit electric motor drive force to move said stand member.

5. A stand device for two wheeled vehicles according to claim 2 wherein said resilient body is a spring.

6. A stand device for two wheeled vehicles according to any one of claims 4, 5, 1, 2 or 3 wherein said pivot support means comprises a shaft about which said stand member and said drive mechanism rotate.

7. A stand device for two wheeled vehicles according to any one of claims 4, 5, 1, 2 or 3 wherein said pivot support means comprises a pivot about which said drive mechanism rotates and wherein said stand member is rotatably supported by said drive mechanism.

8. A stand device for two wheeled vehicles according to any one of claims 4, 5, 1, 2 or 3 wherein the stand member comprises two legs to support the two wheeled vehicle.

9. A stand device for two wheeled vehicles according to any one of claims 4, 5, 1, 2 or 3 wherein the stand member comprises a single stand member to support the two wheeled vehicle.

10. A stand device for two wheeled vehicles according to any one of claims 4, 5, 1, 2 or 3 wherein the stand member comprises at least one leg to support the two wheeled vehicle.

11. A stand device for two wheeled vehicles according to any one of claims 4, 5, 1, 2 or 3 wherein the two wheeled vehicle is a motorcycle.

* * * * *